United States Patent
Yu

(10) Patent No.: US 6,478,717 B1
(45) Date of Patent: Nov. 12, 2002

(54) DAMPER CLUTCH CONTROL METHOD FOR AUTOMATIC TRANSMISSION

(75) Inventor: Pyung-Hwan Yu, Suwon (KR)

(73) Assignee: Hyundai Motor Company, Seoul (KR)

( * ) Notice: Subject to any disclaimer, the term of this patent is extended or adjusted under 35 U.S.C. 154(b) by 45 days.

(21) Appl. No.: 09/697,321

(22) Filed: Oct. 27, 2000

(30) Foreign Application Priority Data

Oct. 29, 1999 (KR) .............................................. 99-47435

(51) Int. Cl.⁷ .............................................. B60K 41/02
(52) U.S. Cl. ......................... 477/175; 477/169; 477/64; 477/180; 192/3.31
(58) Field of Search ................................ 477/175, 176, 477/64, 169, 180; 192/3.28, 3.31

(56) References Cited

U.S. PATENT DOCUMENTS

| | | | | |
|---|---|---|---|---|
| 4,514,811 A | * | 4/1985 | Daubenmier et al. | .... 364/424.1 |
| 5,060,769 A | * | 10/1991 | Yoshimura et al. | ........ 192/3.29 |
| 5,547,438 A | * | 8/1996 | Nozaki et al. | .............. 477/169 |
| 5,743,828 A | * | 4/1998 | Kuriyama et al. | .......... 477/169 |

FOREIGN PATENT DOCUMENTS

JP        05016704        *  5/1993

* cited by examiner

Primary Examiner—Sherry Estremsky
Assistant Examiner—Tisha D. Lewis
(74) Attorney, Agent, or Firm—Birch, Stewart, Kolasch & Birch, LLP

(57) ABSTRACT

A damper clutch control method comprising the steps of detecting a throttle opening, an engine rpm and an turbine rpm; performing lift-foot-up shifting if throttle opening is abruptly decreased; determining if a difference in engine rpm and turbine rpm is below a predetermined value; and duty controlling a damper clutch if the difference in engine rpm and turbine rpm is below the predetermined value.

3 Claims, 4 Drawing Sheets

US 6,478,717 B1

DAMPER CLUTCH CONTROL METHOD FOR AUTOMATIC TRANSMISSION

BACKGROUND OF THE INVENTION (a) Field of the Invention

The present invention relates to an automatic transmission, and more particularly, to a damper clutch control method for an automatic transmission which reduces shock caused by specific operations of an accelerator pedal.

(b) Description of the Related Art

A damper clutch (D/C) is provided in a torque converter to enable engine torque to be directly used by the transmission without first being multiplied by the torque converter. That is, when vehicle driving conditions are such that engine torque does not require alteration before being supplied to the transmission, the D/C in the torque converter is engaged to enable the direct supply of engine torque to the transmission.

The scope of operation of the D/C is determined by rpm of a turbine, which is linked to the transmission, and by throttle valve opening. If the turbine rpm and throttle valve opening are at predetermined levels (i.e., predetermined combinations), a transmission control unit (TCU) outputs a drive signal to a D/C control solenoid valve to operate the D/C.

FIG. 1 shows a graph of operating and non-operating regions of the D/C. As shown in the drawing, throttle opening and turbine rpm Nt must be at specific levels for the D/C to operate. That is, certain combinations or ratios of throttle opening and turbine rpm define a region B during which the D/C is engaged, whereas at other regions A and C, which are defined by other specific combinations of throttle opening and turbine rpm, the D/C is not engaged.

During the operation of the vehicle, the driver may at times abruptly release his foot from the accelerator pedal such that the throttle valve is closed. When this occurs, lift-foot-up (LFU) shifting is performed. At this time, the driver may again depress the accelerator pedal, which is referred to tip-in. In either of these situations, throttle valve opening, turbine rpm Nt and engine rpm Ne vary as shown in FIG. 2 so that the D/C is disengaged.

FIG. 2 shows a graph of throttle valve opening and corresponding turbine rpm Nt, engine rpm Ne and torque T during LFU shifting and tip-in. As shown in the drawing, engine rpm Ne and turbine rpm Nt increase and decrease in accordance with changes in throttle valve opening. Reference numerals 3 and 4 in the drawing indicate points at which shock occurs. In more detail, when throttle opening is abruptly reduced, a corresponding drop occurs in torque T. Torque T continues at this low level until turbine rpm Nt equal engine rpm Ne (i.e., where shifting is completed). At this point, LFU shock 3 occurs. In a state where engine rpm Ne are less than turbine rpm Nt, if the accelerator pedal is again depressed by the driver so that throttle opening is increased, tip-in shock 4 occurs.

With the disengagement of the D/C, engine rpm Ne are reduced and vehicle speed increased. As a result, shock occurs and the overall ride comfort of the vehicle deteriorates.

SUMMARY OF THE INVENTION

The present invention has been made in an effort to solve the above problems.

It is an object of the present invention to provide a damper clutch control method for an automatic transmission which reduces shock generated during LFU shifting and tip-in by increasing an operating scope of a D/C.

To achieve the above object, the present invention provides a damper clutch control method comprising the steps of detecting a throttle opening, an engine rpm and an turbine rpm; performing lift-foot-up shifting if throttle opening is abruptly decreased; determining if a difference in engine rpm and turbine rpm is below a predetermined value; and duty controlling a damper clutch if the difference in engine rpm and turbine rpm is below the predetermined value.

According to a feature of the present invention, the predetermined value of the difference in engine rpm and turbine rpm is approximately 100 rpm.

According to another feature of the present invention, the step of duty controlling the damper clutch is performed for a predetermined duration and at a predetermined duty, after which the duty is controlled such that engine rpm and turbine rpm are equal.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 2 is a graph of throttle valve opening and corresponding turbine rpm Nt, engine rpm Ne and torque T during LFU shifting and tip-in;

DETAILED DESCRIPTION OF THE PREFERRED EMBODIMENTS

Preferred embodiments of the present invention will now be described in detail with reference to the accompanying drawings.

Figure 3:
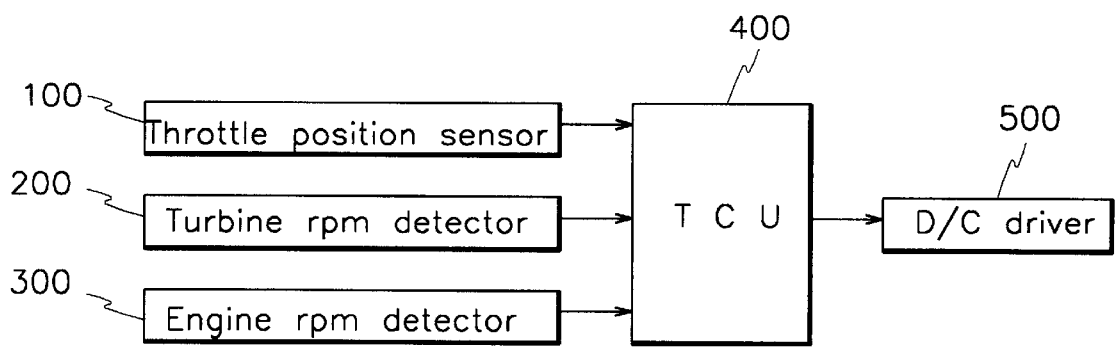
FIG. 3 is a block diagram of a damper clutch control system according to a preferred embodiment of the present invention.

FIG. 3 shows a block diagram of a damper clutch control system according to a preferred embodiment of the present invention.

The damper clutch control system includes a throttle position sensor 100 for detecting the degree of opening of a throttle valve, which varies according to driver manipulation of an accelerator pedal, and outputting corresponding signals; a turbine rpm detector 200 for detecting rpm of a turbine of a torque converter and outputting corresponding signals, the turbine being connected to an input shaft of a transmission; an engine rpm detector 300 for detecting rpm of a crankshaft of an engine and outputting corresponding signals; a TCU 400 receiving the signals output by the throttle position sensor 100, turbine rpm detector 200 and engine rpm detector 300, and, according to the received signals, outputting a D/C control signal such that a D/C is engaged even in a disengage range in order to prevent the generation of shock during LFU shifting and tip-in; and a D/C driver 500 for operating the D/C according to the D/C control signal output by the TCU 400.

In the damper clutch control system structured as in the above, a driving state of the vehicle is determined by the signals output by the throttle position sensor 100, turbine rpm detector 200 and engine rpm detector in step S100.

Figure 4:
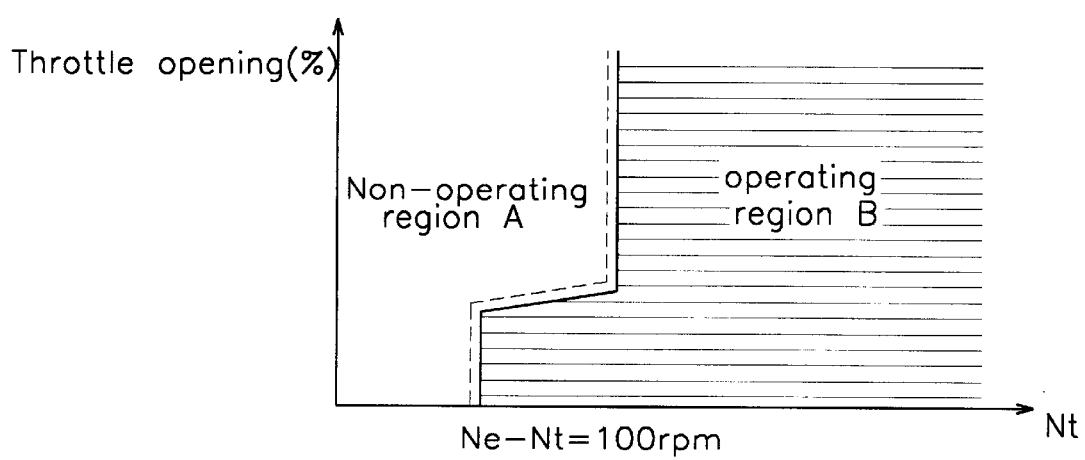
FIG. 4 is a graph of operating and non-operating regions of a damper clutch according to a preferred embodiment of the present invention.
Figure 5:
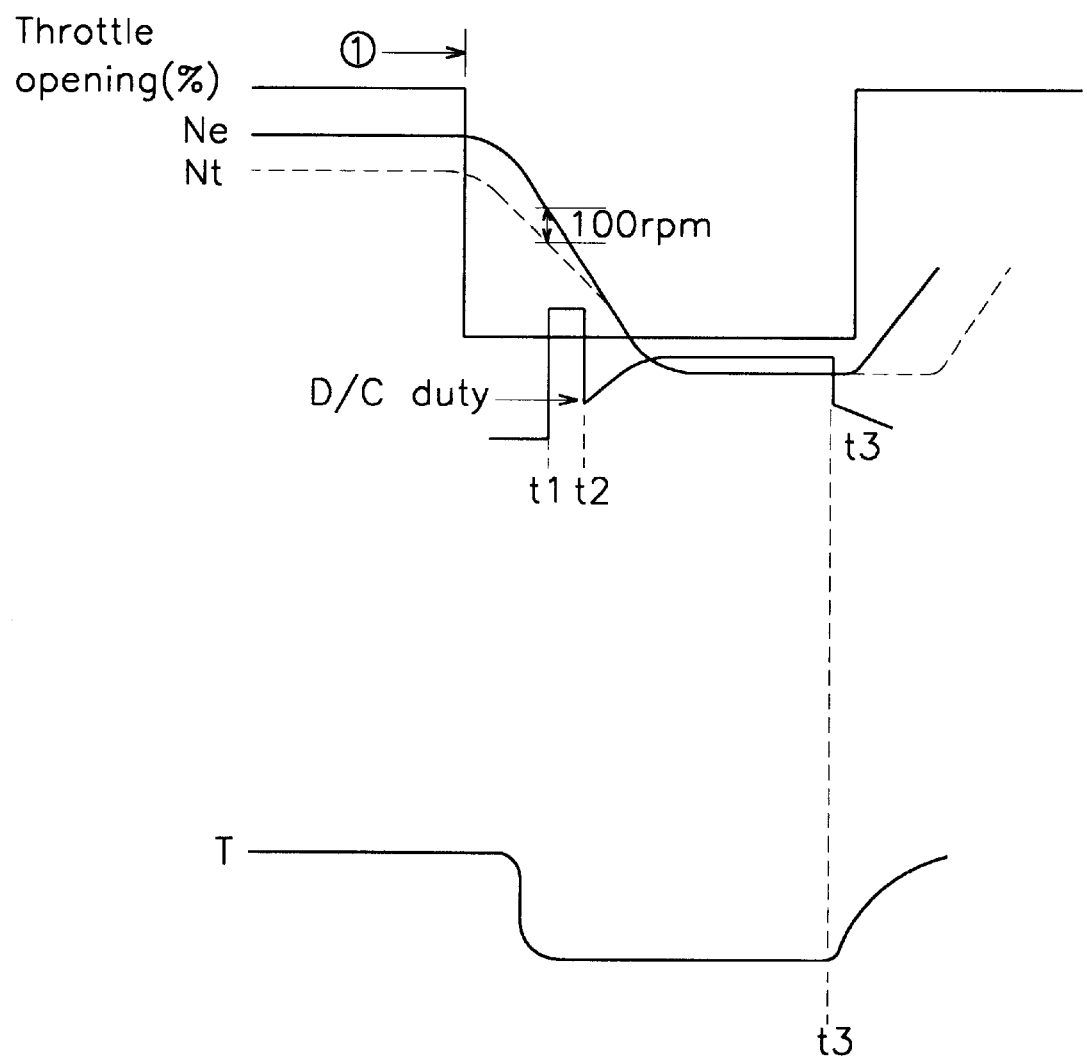
FIG. 5 is a graph of duty control during LFU shifting and tip-in of the damper clutch according to a preferred embodiment of the present invention.
Figure 6:
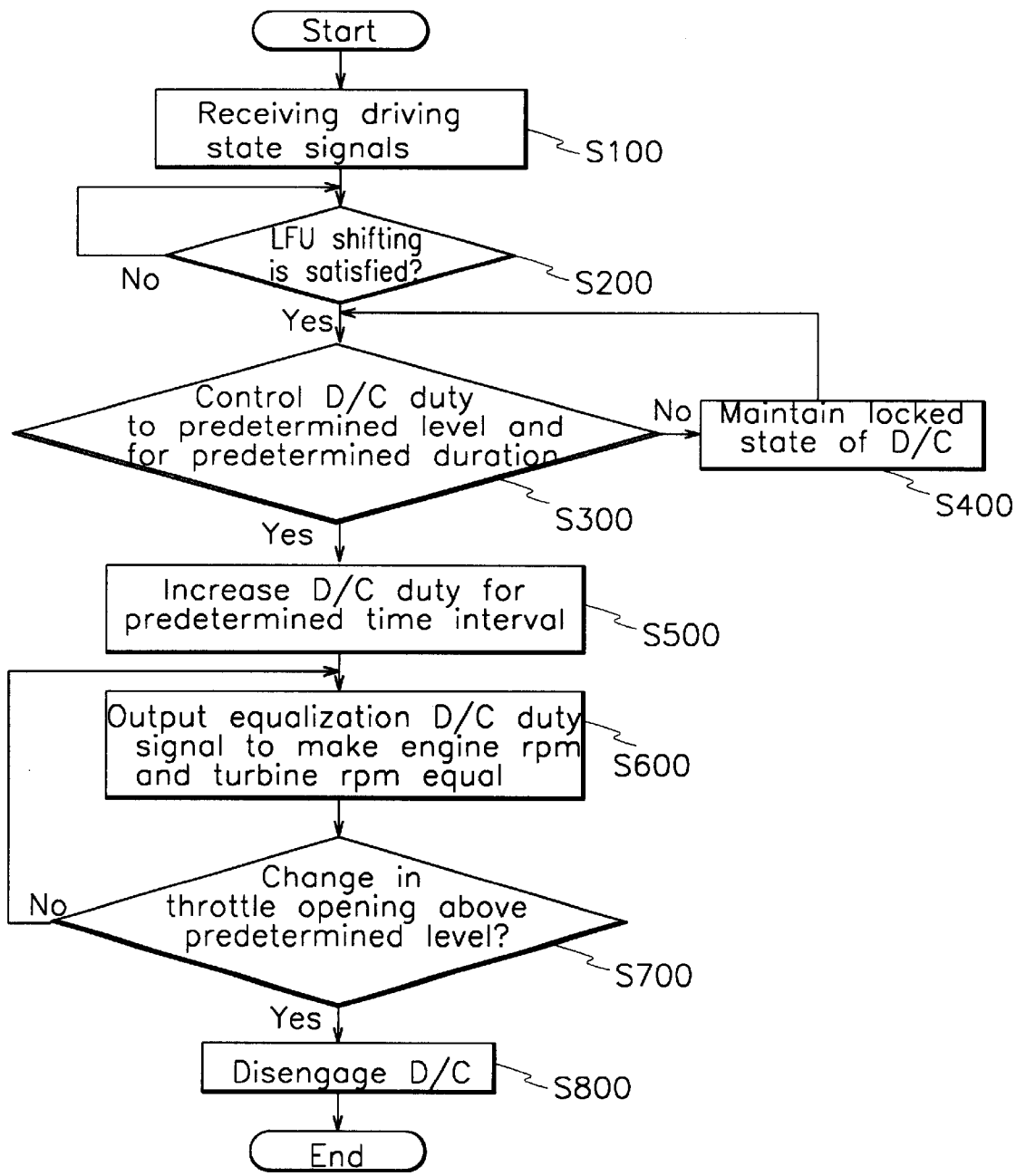
FIG. 6 is a flow chart of a damper clutch control method according to a preferred embodiment of the present invention.

If the throttle valve opening and turbine rpm Nt are at specific predetermined combinations or ratios, the D/C is engaged. That is, as shown in FIG. 4, certain ratios of throttle opening and turbine rpm Nt define an operating region B in which the D/C is engaged, while other combinations of throttle opening and turbine rpm Nt define a non-operating region A in which the D/C is not operated. In a state where the turbine rpm Nt and throttle opening ratio are within the operating region B, if the driver abruptly releases the accelerator pedal, the TCU 400 first determines that such an operation has taken place through signals received from the throttle position sensor 100, then performs control to effect LFU upshifting in step S200. Accordingly, engine rpm Ne and turbine rpm Nt gradually reduce as shown in FIG. 5 such that the ratio of throttle opening and turbine rpm Nt fall outside the operating region B and into the non-operating region A.

In the above, if engine rpm Ne and turbine rpm Nt fall below predetermined levels, the D/C is typically locked. Such locking of the D/C causes the generation of LFU and tip-in shock. Therefore, in the present invention, the TCU 400, after determining that LFU shifting must be performed, determines if the ratio of throttle valve opening and turbine rpm Nt falls outside the non-operating region A. If these two conditions are met, the TCU 400 performs control such that the D/C is temporarily disengaged in order to prevent LFU and tip-in shock. In more detail, using the signals output from the turbine rpm detector 200 and the engine rpm detector 300, the TCU 400 determines when a difference in engine rpm Ne and turbine rpm Nt is less than 100 rpm, which occurs at point t1 as shown in FIG. 5. At point t1, the TCU 400 outputs a duty control signal to the D/C driver 500 such that a duty of the D/C is controlled to a predetermined level for a predetermined duration in step S300. However, if the difference in engine rpm Ne and turbine rpm Nt is not less than 100 rpm, the TCU 400 maintains the locked state of the D/C in step S400.

In the above, upon receiving the duty control signal from the TCU 400, the D/C driver 500 reduces hydraulic pressure acting on one end of a damper clutch control valve according to D/C duty such that a line of D/C operational hydraulic pressure is fully open. As a result, the D/C contacts the torque converter with a force substantial enough to limit slipping. At this time, in order to improve the responsiveness of the D/C, the TCU 400 outputs a control signal to increase D/C duty for a predetermined time interval (point t1–point t2) in step S500.

Subsequently, the TCU 400 compares engine rpm Ne and turbine rpm Nt, and outputs an equalization D/C duty signal to the D/C driver 500 such that engine rpm Ne and turbine rpm Nt are controlled to the same levels during the interval of point t2 and point t3 in step S600. That is, the TCU 400 outputs the equalization D/C duty signal to the D/C driver 500, and the D/C driver 500, in turn, controls the D/C to realize equal levels in engine rpm Ne and turbine rpm Nt.

In the above state, if the driver again depresses the accelerator pedal such that throttle opening abruptly increases and if the change in throttle opening is above a predetermined level, the D/C is disengaged in steps S700 and S800.

Figure 1:
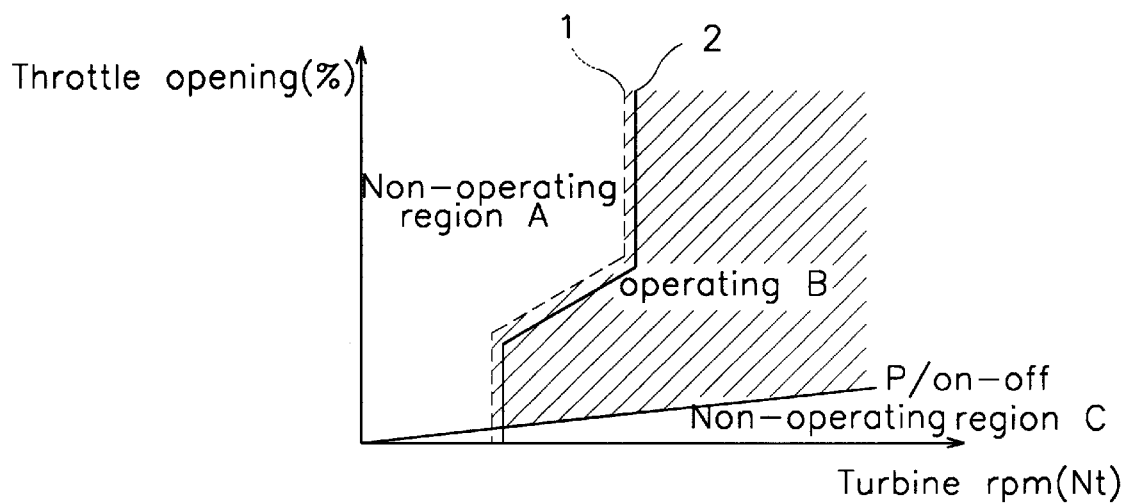
FIG. 1 is a graph of showing operating and non-operating regions of a conventional damper clutch.

Accordingly, the D/C operating region during LFU shifting becomes operating region B of FIG. 4, and the D/C non-operating becomes non-operating region A. That is, if the regions of FIG. 4 are compared with the regions of FIG. 1, operating region B of FIG. 4 also encompasses region C, at which the D/C is not engaged. In the present invention, therefore, the D/C is operated over a larger range of combinations of throttle opening and turbine rpm Nt during LFU shifting.

Figure 2:
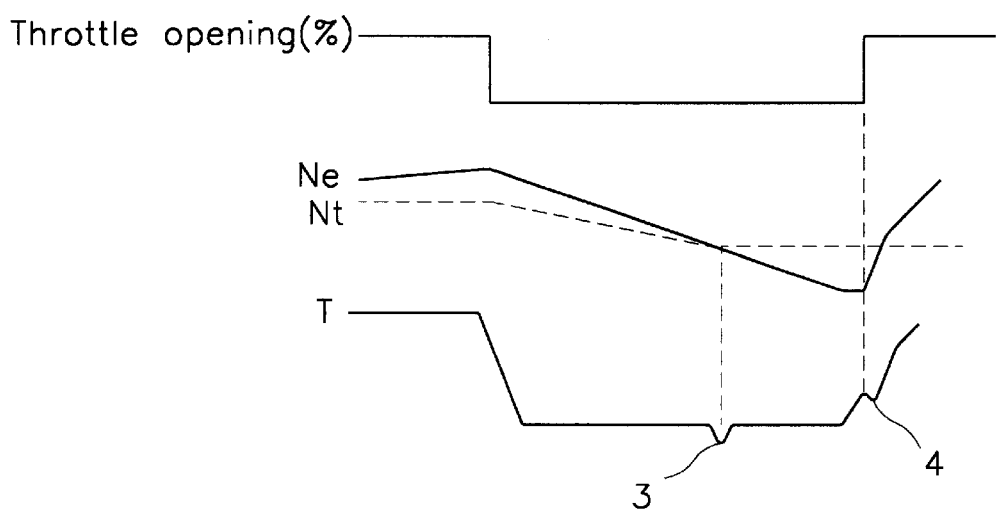

Also, since D/C duty is controlled during LFU shifting such that engine rpm Ne and turbine rpm Nt are equal, no difference in engine rpm Ne and turbine rpm Nt results during the disengagement of the D/C as a result of tip-in. Hence, torque T is varied in such a manner that backlash shock is not generated. In comparing FIG. 5 with FIG. 2, the LFU shock 3 or tip-in shock 4 of FIG. 2 is not present in FIG. 5.

In the damper clutch control method of the present invention, shock generated during LFU shifting and tip-in is prevented by increasing the operating scope of the D/C and adjusting the damper clutch duty according to engine rpm and turbine rpm.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A damper clutch control method comprising the steps of:
    detecting a throttle opening, an engine rpm and a turbine rpm;
    performing lift-foot-up shifting if throttle opening is abruptly decreased;
    determining if a difference in engine rpm and turbine rpm is below a predetermined value; and
    controlling a duty of a damper clutch if the difference in engine rpm and turbine rpm is below the predetermined value such that the engine rpm is maintained to be larger than or equal to the turbine rpm.

2. The damper clutch control method of claim 1 wherein the predetermined value of the difference in engine rpm and turbine rpm is approximately 100 rpm.

3. The damper clutch control method of claim 1 wherein the step of controlling the duty of the damper clutch is performed for a predetermined duration and at a predetermined duty and then at an engaging duty, after which the duty is controlled such that engine rpm and turbine rpm are equal.

* * * * *